United States Patent

Chu et al.

(10) Patent No.: US 10,306,152 B1
(45) Date of Patent: May 28, 2019

(54) AUTO-EXPOSURE CONTROLLER, AUTO-EXPOSURE CONTROL METHOD AND SYSTEM BASED ON STRUCTURED LIGHT

(71) Applicant: HIMAX TECHNOLOGIES LIMITED, Tainan (TW)

(72) Inventors: Yu-Hsuan Chu, Tainan (TW); Chin-Jung Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 15/896,089

(22) Filed: Feb. 14, 2018

(51) Int. Cl.
*H04N 5/235* (2006.01)
*G06K 9/32* (2006.01)
*G06T 7/50* (2017.01)

(52) U.S. Cl.
CPC ......... *H04N 5/2353* (2013.01); *G06K 9/3233* (2013.01); *G06T 7/50* (2017.01)

(58) Field of Classification Search
CPC .... H04N 5/2353; H04N 5/235; H04N 5/2356; H04N 5/353; H04N 5/359; H04N 5/2354; H04N 5/341; H04N 5/345; H04N 5/3452; H04N 5/3454; G06T 7/50; G06K 9/3233
USPC .......................................... 348/223.1–229.1
See application file for complete search history.

(56) References Cited

U.S. PATENT DOCUMENTS

| | | | | |
|---|---|---|---|---|
| 2015/0339805 A1* | 11/2015 | Ohba | ...................... | G06F 3/011 345/156 |
| 2016/0191776 A1* | 6/2016 | Shroff | .................. | H04N 5/2353 348/362 |
| 2017/0127036 A1* | 5/2017 | You | ...................... | H04N 5/2256 |

* cited by examiner

*Primary Examiner* — Yogesh K Aggarwal
(74) *Attorney, Agent, or Firm* — JCIPRNET (57) ABSTRACT

An auto-exposure (AE) control system, includes a camera configured to capture an input image, a region of interest (ROI) determination circuit configured to determine a ROI of the input image, a depth decoder and an AE controller. The depth decoder is configured to generate a depth map of the input image and determine a decode rate value according to the depth map of the input image and the ROI of the input image. The AE controller includes an exposure adjustment circuit which is configured to receive a decode rate value and the detection result and sequentially adjust a plurality of the exposure parameters according to the variation of the decode rate value. A step size for adjusting the plurality of the exposure parameters is determined according to the variation of the decode rate value and the detection result.

18 Claims, 6 Drawing Sheets

AUTO-EXPOSURE CONTROLLER, AUTO-EXPOSURE CONTROL METHOD AND SYSTEM BASED ON STRUCTURED LIGHT

BACKGROUND

Technical Field

The present invention generally relates to an auto exposure (AE) control method, an AE controller and an AE control system. More particularly, the present invention relates to an AE control method, an AE controller and an AE control system for structured light depth sensing.

Description of Related Art

Electronic devices, especially the ones equipped with cameras and sensors, are widely applied in real-life applications. AE algorithms implemented in the electronic devices are used to adjusted exposure parameters automatically, thereby improving the performance of the electronic devices in deep sensing application. Existing AE algorithms often deal with only a single exposure setting/parameter (e.g., capture image intensity) to perform AE adjustment. However, the single exposure setting/parameter is not enough for the existing AE algorithms to deal with a variety of issues such as brightness changes and scene changes, variance of object depth (e.g., close objects and far away background), object's surface properties difference (e.g., material, reflectivity, color, etc.), noise, motion blur, thereby causing a poor decode quality.

Therefore, there is a need for AE control method for depth sensing which is capable of improving the decode quality for depth sensing applications.

SUMMARY

Accordingly, the present invention is directed to an AE control method and an AE control system that may improve decode quality of depth sensing application.

The present invention provides an AE control method which comprises the steps of receiving an input image; receiving a decode rate value of the input image, wherein the decode rate value is determined according to a depth map of the input image and a region of interest (ROI) of the input image; determining whether a scene of the input image is changed to obtain a detection result; and sequentially adjusting a plurality of the exposure parameters according to a variation of the decode rate value. A step size for adjusting the plurality of the exposure parameters is determined according to the variation of the decode rate value and the detection result.

The present application further provides an AE control system comprising: a camera, a region of interest (ROI) determination circuit, a depth decoder and an AE controller. The camera is configured to capture an input image. The ROI determination circuit is configured to determine a ROI of the input image. The depth decoder is configured to determine a decode rate value according to a depth map of the input image and the ROI of the input image. The AE controller comprises a scene change detection circuit for receiving the input image and detecting whether a scene of the input image is changed to obtain a detection result and an exposure adjustment circuit coupled to the scene change detection circuit. The exposure adjustment circuit receives the decode rate value and the detection result and sequentially adjusts a plurality of the exposure parameters according to the variation of the decode rate value. A step size for adjusting the plurality of the exposure parameters is determined according to the variation of the decode rate value and the detection result.

Based on the above-mentioned description, the exposure parameters are effectively adjusted according to the decode rate and other conditions (such as scene change conditions). The exposure parameters setting combination may improve the decode rate value, thereby improving the performance of the AE control in depth sensing application. In addition, a selection of ROI and step size may further improve the performance of the AE control method.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

With reference to the attached drawings, the present invention is described by means of the embodiment(s) below. Therein, the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, nor with the actual ratio. Some of the dimensions or dimension ratios have been enlarged or simplified to provide a better illustration. The actual numbers, actual shapes, or actual dimension ratios may be selectively designed and disposed and the detail component layouts may be more complicated.

Figure 1:
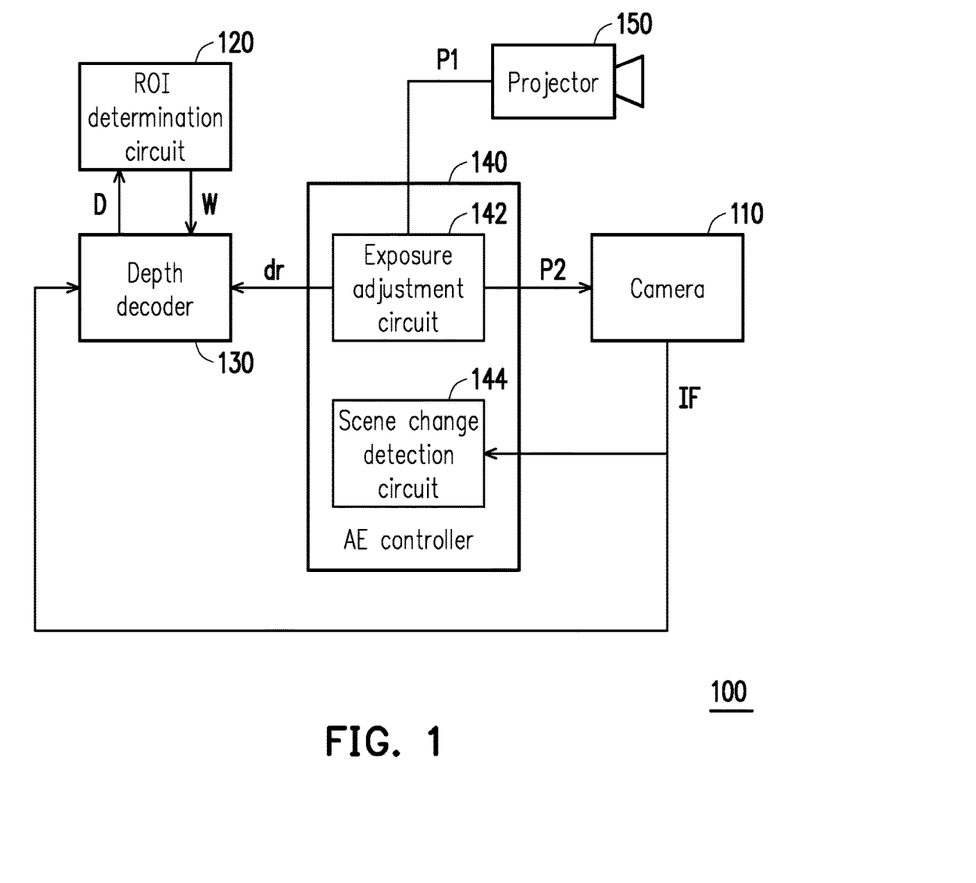
FIG. 1 is a block diagram of an AE control system including an AE controller for capturing structured light image according to an embodiment of the present invention.

Referring to FIG. 1, an AE control system 100 includes a camera 110, a ROI determination circuit 120, a depth decoder 130, an AE controller 140 and a projector 150. The camera 110 is configured to capture an input image IF and provide the input image IF to the depth decoder 130 and the AE controller 140. The camera 110 may be an infrared (IR) camera which captures infrared images or near-infrared images, but the present invention is not limited thereto. Any type of camera and any format of the input image captured by the camera fall within the scope of the present application.

The projector 150 may project visible or invisible light beams or a number of visible or invisible dots to support the camera to take the input image or to support a determination of depth value in the input image. In an example, the projector 150 may project a structured light pattern in form of infrared beams or laser beams in a specific power to the environment in the front of the projector 150; and the camera 110 may capture the structured light pattern rebounded from an object to generate the input image.

The depth decoder 130 receives the input image from the camera 110 and decodes the input image to generate a depth map D which includes a plurality of depth values of the input image. The depth decoder 130 may also compare the depth map D corresponding to the current input image with depth maps of previous input images to obtain a depth disparity map. The depth disparity map indicates a variation in depth values of the input images. The depth decoder 130 may decode the input image in block-based or in pixel-based to generate a block-based depth map or a pixel-based depth map or both. The depth map D which is generated by the depth decoder 130 may be provided to the ROI determination circuit 120. The algorithms for the depth decoder 130 to decode the input image are not limited in the present application.

The ROI determination circuit 120 may determine a specific ROI automatically according to the exposure values of the input image. For example, regions of shadow or some objects with low reflectivity may impacts the performance of depth sensing accuracy. Therefore, these regions should be removed from the ROI. The ROI determination circuit 120 may determine the under-exposure regions and over-exposure regions in the input image and remove the under-exposure regions and over-exposure regions to obtain the ROI. The over-exposure regions may have exposure values greater than a non-zero exposure threshold and the under-exposure region has exposure values smaller than a non-zero exposure threshold. Alternatively, the over-exposure regions and under-exposure regions may be determined according to intensity or brightness or any other parameters of the input images.

In another embodiment, the ROI determination circuit 120 may receive a first image with a structured light pattern which is captured with the highest power of the projector 150 and a second image with a structured light pattern which is captured with the lowest power of the projector 150. Next, the ROI determination circuit 120 removes the under-exposure regions of the first image and over-exposure regions of the second image and in combination with the decode result to determine the ROI.

In addition, the ROI determination circuit 120 may further remove well-exposure but hardly decode regions from the ROI. Because of limitations of the hardware's capability and various reasons, the depth decoder may not sense the depth values even if the exposure values are normal. As such, the ROI determination circuit 120 in the present application may further remove the hardly decode regions from the ROI so as to improve the performance of the AE control system 100.

The ROI determination circuit 120 may also use user-defined regions to determine the ROI. For example, the ROI determination circuit 120 may determine the ROI according to the user-defined regions, decode result and the under-exposure and over-exposure regions. The ROI may be presented by a weight map W. It should be noted that the weight map W indicating the ROI can be in block-based weight map or pixel-based weight map.

In an embodiment of the present invention, the ROI determination circuit 120 is activated to determine the ROI of the input image when the AE control system is booted up or when the scene of the input image is changed.

The depth decoder 130 may generate decode rate values according to the depth values (e.g., depth map D) and the ROI (e.g., weight map W). A depth value may not be detected in some of the pixels of the input image, and the decode rate value is proportional to the number of pixels where the pixel's depth values are detected. For example, if the depth decoder 130 is operating in block-based (each block has n pixels), where the depth values of only p pixels among the n pixels are detected (p is smaller than or equal to n), then the decode rate value is determined according to the value p and the weight value corresponding to the specific block. The depth decoder 130 may generate a detectable depth map which indicates the number of pixels within each block where the depth value is detected. The detectable depth map and the ROI may be used to weight the decode rate.

The AE controller 140 includes an exposure adjustment circuit 142 and a scene change detection circuit 144. The scene change detection circuit 144 is coupled to the camera 110 to receive the input image IF captured by the camera 110 and is configured to detect a scene change in the input image IF. The scene change detection unit 144 may apply motion detection algorithm to determine whether the scene of the input image IF is changed. Alternatively, the scene change detection unit 144 may determine the change of scene of the input image IF according to a variation of the decode rate, a variation of the depth values or the change of the intensity of the input image IF, or a combination thereof. For example, if the variation of the decode rate value is greater than a decode rate threshold, then the scene change detection unit 144 may determine that the scene of the input image is changed. If the variation of the depth value is greater than a depth value threshold, then the scene change determination circuit 144 may determine that the scene of the input image IF is changed. If the variation of the intensity of the entire input image IF is greater than a predetermined threshold, then the scene change determination circuit 144 may determine that the scene of the input image IF is changed.

The exposure adjustment circuit 142 is coupled to the depth decoder 130 and the scene change detection circuit 144 to receive the decode rate value from the depth decoder 130 and the scene change determination result. The exposure adjustment circuit 142 is configured to adjust the exposure parameters according to the decode rate value and the scene change determination result. The exposure parameters may include the parameters P1 for controlling the projector 150 and parameters P2 for controlling the camera 100. The parameter P1 may include a projector power and the parameter P2 may include an analog gain and an exposure time. In an embodiment, the projector 150 includes a laser diode source (now shown), and the projector power include the laser diode power.

Figure 2:
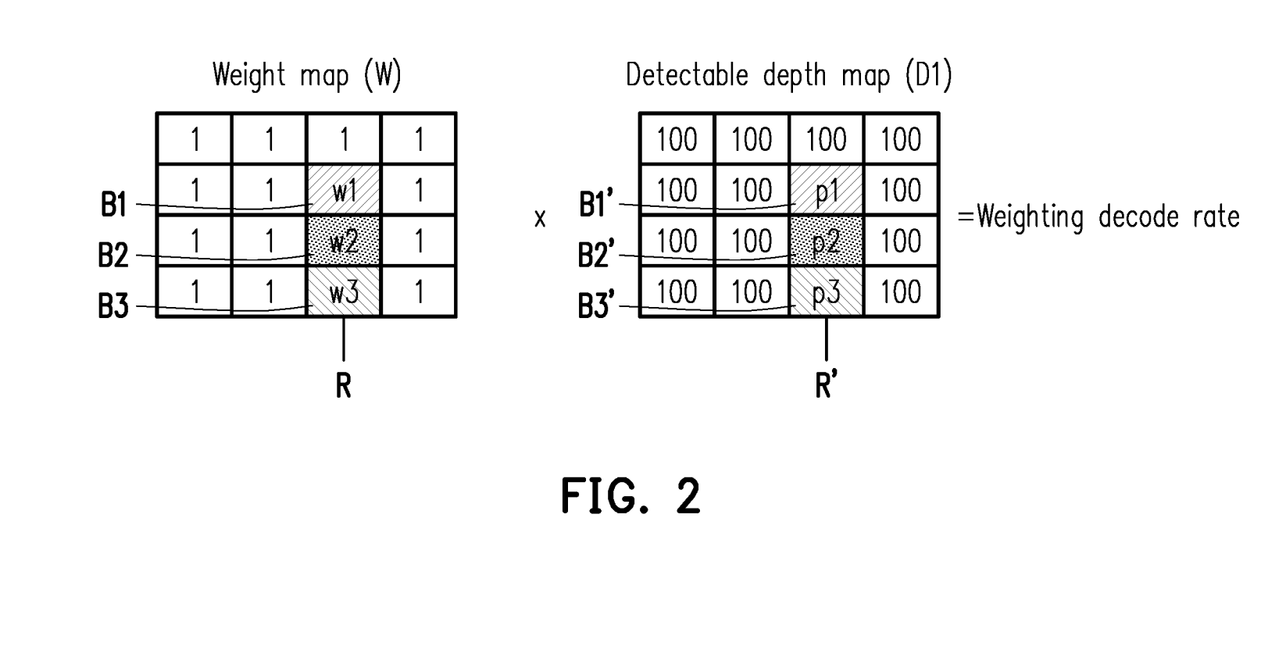
FIG. 2 is an example of weighting decode rate according to an embodiment of the present invention.

Referring to FIG. 1 and FIG. 2, the weight map W is provided by the ROI determination circuit 120 and a detectable depth map D1 are provided by the depth decoder 130. The weight map W and the detectable map D1 may be block-based maps, and the detectable depth map D1 indicate a number of pixels within each block of n pixels where the depth value is detectable. The weight map W indicate the ROI region determined by the ROI determination circuit 120. For example, within the region R' of the detectable depth map D1, block B1' has p pixels whose depth value is detected; block B2' has p2 pixels whose depth value is detected; and block B3' has p3 pixels whose depth value is detected. The weight map W has a region R corresponding to the region R's in the detectable depth map D1; and the region R has blocks B1, B2 and B3 which are corresponded to the block B1', B2' and B3' of the region R' of the detectable depth map D1. The weights of the blocks B1, B2 and B3 are w1, w2 and w3, respectively. A decode rate weight corresponding to the region R is calculated according to the following equation:

$$\text{Decode rate weight}(R) = \frac{\sum_{i=1}^{3} pi * wi}{3 * n} \quad (1)$$

The decode rate value may be determined according to the decode rate weight of the region R and the depth values of the region R. The calculated decode rate value is used to adjust the values of exposure parameters P1 and P2.

Figure 3A:
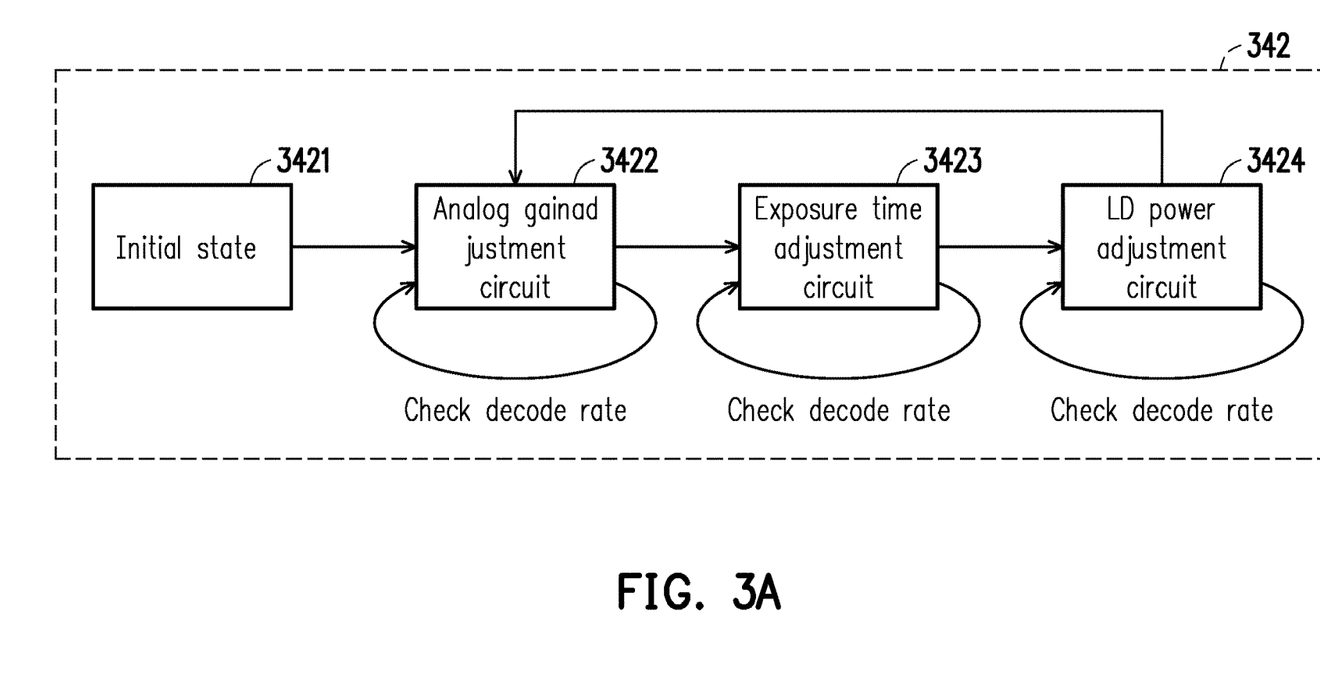
FIG. 3A is a block diagram of an exposure adjustment circuit according to an embodiment of the present application.

FIG. 3A illustrates an exposure adjustment circuit 342 according to an embodiment of the present application. The exposure adjustment circuit 342 may include an initial state circuit 3421, an analog gain adjustment circuit 3422, an exposure time adjustment circuit 3423 and the projector power adjustment circuit 3424. The initial state circuit 3421 is configured to generate the initial values of the exposure parameters such as the analog gain, the exposure time and the projector power, and provide these initial exposure parameters to the analog gain adjustment circuit 3422, the exposure time adjustment circuit 3423 and the projector power adjustment circuit 3424.

Figure 3B:
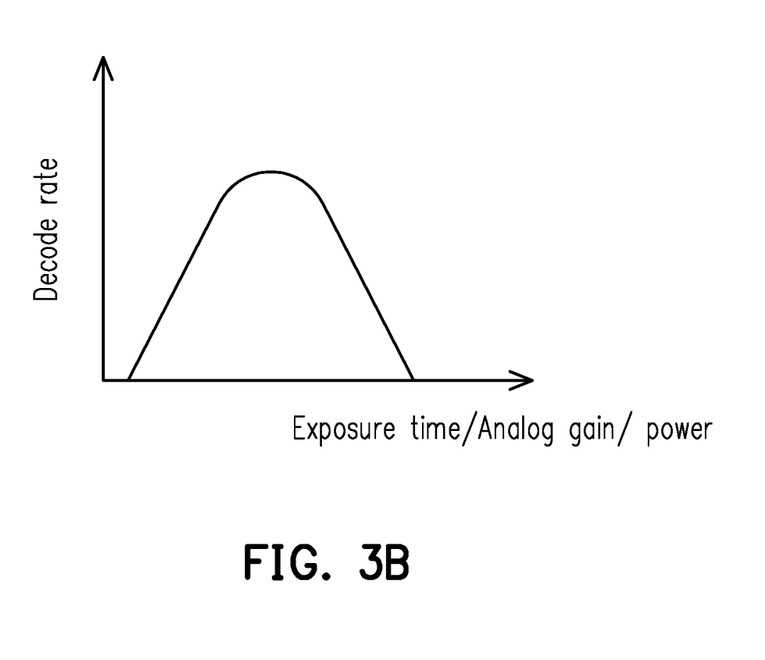
FIG. 3B is an example of a relationship between the decode rate value and exposure parameters according to an embodiment of the present application.

The analog gain adjustment circuit 3422, the exposure time adjustment circuit 3423 and the projector power adjustment circuit 3424 are configured to adjust the values of the analog gain, exposure time and projector power according to the decode rate in a gradient decent method with a specific step size, where the specific step size is determined according to the decode rate value and the scene change determination result. The relationship between the decode rate and the analog gain or the exposure time or the projection power is according to a convex curve as shown in FIG. 3B. The analog gain adjustment circuit 3422 may iteratively adjust the value of the analog gain until the maximum decode rate value is obtained. Once the process for adjusting the analog gain is completed, the exposure time adjustment circuit 3423 iteratively adjusts the value of the exposure time according to the decode rate in the gradient method until the maximum decode rate value is obtained. Once the process for adjusting the exposure time is completed, the projector power adjustment circuit 3424 iteratively adjusts the value of the projector power according to the decode rate in the gradient method until the maximum decode rate value is obtained.

As such, the exposure parameters are sequentially adjusted according to the decode rate value. Each of the exposure parameters is iteratively adjusted according to the decode rate value in a manner of maximizing the decode rate value. In FIG. 3A, the adjustment order is analog gain, then exposure time, and then projector power, but the present invention is not limited to any adjustment order of the exposure parameters.

Figure 4:
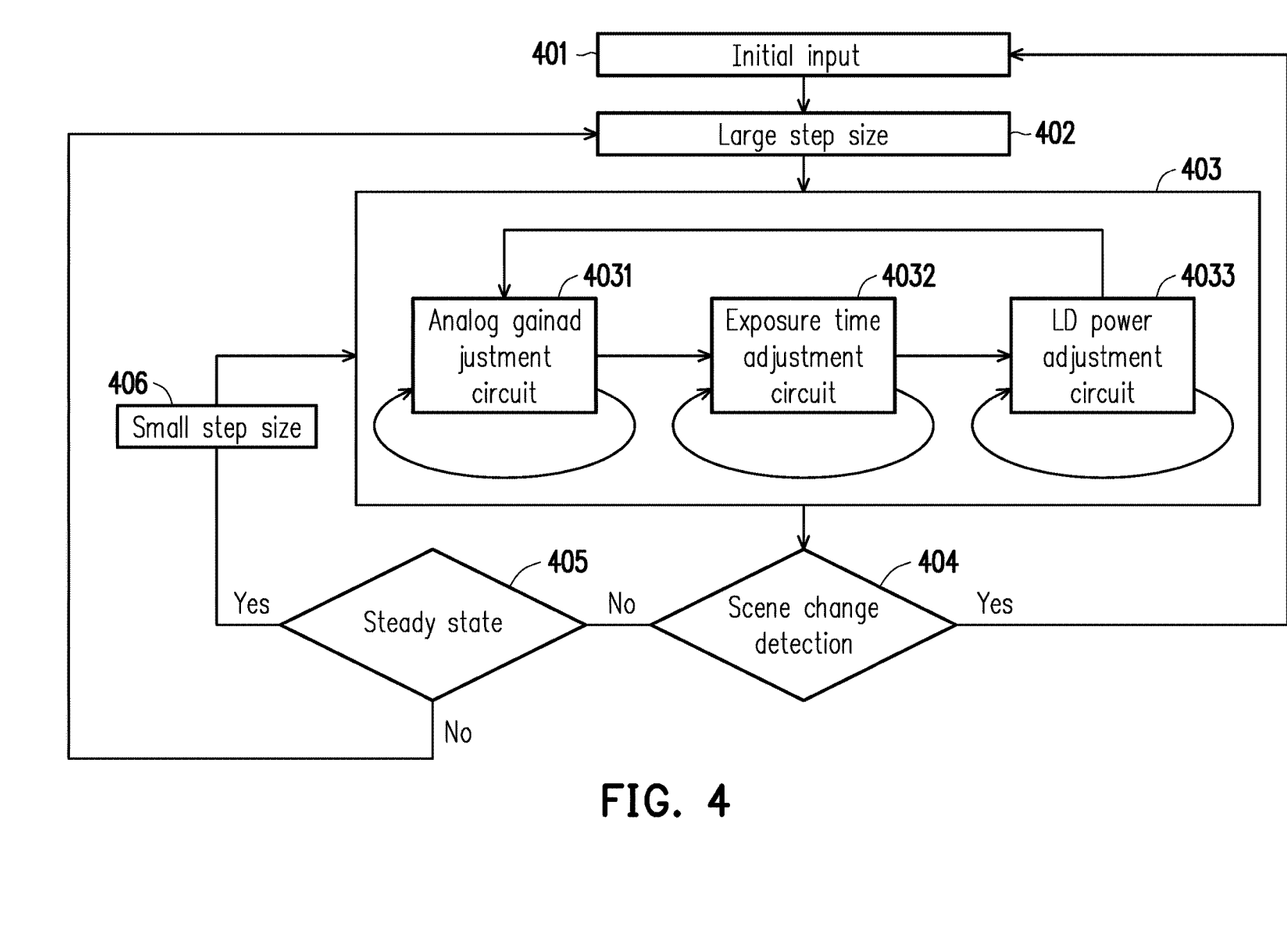
FIG. 4 is a block diagram illustrating the flowchart of an AE control method according to an embodiment of the present application.

FIG. 4 illustrates the flowchart of an AE control method according to an embodiment of the present application. In step S401, the exposure parameters which may include an analog gain, an exposure time and a projector power are initialized to initial values. In step S402, a large step size value is set to the step size value of the gradient decent method, and each of the exposure parameters is adjusted according to the decode rate value based on large step size in step S403. The step size of the gradient decent method is set to a large value so that the system may quickly locate the maximum value of the decode rate. The step S403 includes sub-steps S4031 to S4033 wherein the sub-step S4031 is for adjusting the analog gain; the sub-step S4032 is for adjusting the exposure time; and the sub-step S4033 is for adjusting the projector power.

When the processes for adjusting the analog gain, the exposure time and the projector power are completed in step S403, the scene change detection is performed to detect whether the scene of the input image is changed in step S404. The scene change is determined according to motion detection or variation of the decode rate values or the variation of depth values or a variation of the intensity or a combination thereof. If the scene of the input image is changed, step S401 to S403 are re-performed.

When the scene of the input image is not changed, step S405 is performed to determine whether the steady state is obtained. The steady state may be determined according to the variation of decode rate value. If the variation of the decode rate value is smaller than a preset threshold value, then the steady state is obtained. Otherwise, if the variation of the decode rate value is greater than or equal to the preset threshold value, then the steady state is not obtained. If the steady state is obtained, the step size of the gradient decent method is set to be a small value, so that the system may accurately adjust the values of the exposure parameters to obtain the maximum value of the decode rate. It should be noted that in the steps S403, the exposure parameters are sequentially adjusted, but the order of adjusting the exposure parameters are not limited in the present invention.

If the steady state is not obtained in steps S405, the step size of the gradient decent method is set to the large value, and the adjustment processes are performed in step S403 with the large step size value.

Figure 5:
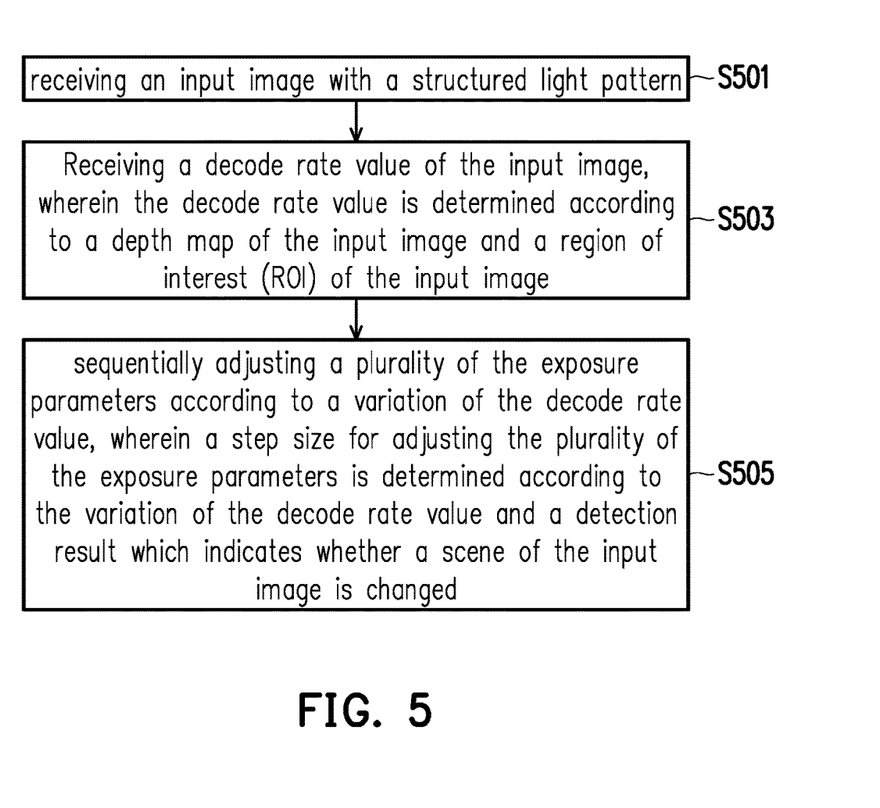
FIG. 5 is a flowchart diagram of an AE control method according to an embodiment of the present application.

Referring to FIG. 5, an AE control method according to an embodiment of the present application is illustrated. In step S501, an input image with a structured light pattern is received; and in steps S503, decode rate value of the input image is received, wherein the decode rate value is determined according to a depth map of the input image and a region of interest (ROI) of the input image. The ROI of the input image may be determined according to user-defined regions, exposure values and the depth map.

In steps S505, the method sequentially adjusting a plurality of the exposure parameters according to a variation of the decode rate value, wherein a step size for adjusting the plurality of the exposure parameters is determined according to the variation of the decode rate value and the detection result.

In the embodiments of the present invention, the exposure parameters are effectively adjusted according to the decode rate and other conditions such as scene change conditions. The exposure parameters setting combination may improve the decode rate value of the AE control for depth sensing. Furthermore, a selection of ROI may remove the low reflectivity and hardly decoded regions, thereby eliminating the negative influence of these regions to the performance of the AE control. The setting of the step size for adjusting the exposure parameters may quickly and accurately locate the exposure parameters that maximize the decode rate, thereby improving the performance of AE control method.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An auto-exposure (AE) control method, comprising:
   receiving an input image with a structured light pattern;
   receiving a decode rate value of the input image, wherein the decode rate value is determined according to a depth map of the input image and a region of interest (ROI) of the input image; and
   a sequentially adjusting a plurality of exposure parameters according to a variation of the decode rate value, wherein a step size for adjusting the plurality of the exposure parameters is determined according to the variation of the decode rate value and a detection result which indicates whether a scene of the input image is changed.

2. The AE control method of claim 1, wherein the plurality of exposure parameters comprises a projection power, an analog gain and an exposure time, wherein the projection power is used to control a projector, and the analog gain and the exposure time are used to control a camera.

3. The AE control method of claim 1, wherein the plurality of the exposure parameters is adjusted according to the variation of the decode rate value based on a gradient decent method.

4. The AE control method of claim 3, further comprising:
   determining whether the scene of the input image is changed to obtain the detection result,
   wherein the step of sequentially adjusting the plurality of the exposure parameters according to the variation of the decode rate value comprises:
   if the scene of the input image is changed, initializing values for the exposure parameters and iteratively adjusting the exposure parameters with a first step size according to the variation of the decode rate value; and
   if the scene of the input image is not changed, determining whether a steady state is obtained.

5. The AE control method of claim 4, wherein the scene of the image is changed when the variation of the decode rate value is greater than a first preset threshold or a variation of a depth mean value is greater than a second preset threshold or a variation of an intensity value is greater than a third preset threshold.

6. The AE control method of claim 4, wherein the step of determining whether the steady state is obtained comprises:
   determining whether the variation of the decode rate value is greater than or equal to a fourth preset threshold;
   if the variation of the decode rate value is greater than or equal to the fourth preset value, determining that the steady state is obtained; and
   if the variation of the decode rate value is smaller than the fourth preset value, determining that the steady state is not obtained.

7. The AE control method of claim 4, further comprises:
   if the steady stated is not obtained, iteratively adjusting the exposure parameters according to the variation of the decode rate value in the first step size; and
   if the steady state is obtained, iteratively adjusting the exposure parameters according to the variation of the decode rate value in a second step size, wherein the second step size is smaller than the first step size.

8. The AE control method of claim 1, further comprising:
   capturing a first image with a structured light pattern and a first projection power and a second image with the structured light pattern and a second projection power, wherein the first projection power is the highest projection power that is supported, and the second projection power is the lowest projection power that is supported;
   removing over-exposure regions and under-exposure regions in the first image and the second image to obtain remaining regions, wherein the over-exposure regions has exposure values greater than a first exposure threshold and the under-exposure region has exposure values smaller than a second exposure threshold; and
   selecting the ROI among the remaining regions according to the decode rate value.

9. The AE control method of claim 8, further comprising:
   obtaining a user-defined region;
   selecting the ROI among the remaining regions according to the decode rate value and the user-defined region.

10. An auto-exposure (AE) control system, comprising:
    a camera, configured to capture an input image with a structured light pattern from a projector;
    a region of interest (ROI) determination circuit, configured to determine a ROI of the input image;
    a depth decoder, coupled to the camera and the ROI determination circuit, and configured to generate a depth map of the input image and determine a decode rate value according to the depth map of the input image and the ROI of the input image; and
    an AE controller, coupled to the projector, the camera and the depth decoder, comprising:
        an exposure adjustment circuit, receiving the decode rate value and the detection result, and sequentially adjusting a plurality of exposure parameters according to the variation of the decode rate value, wherein a step size for adjusting the plurality of the exposure parameters is determined according to the variation of the decode rate value and a detection result which indicates whether a scene of the input image is changed.

11. The AE control system of claim 10, wherein the plurality of exposure parameters comprises a projection power, an analog gain and an exposure time, wherein the projection power is used to control a projector, and the analog gain and the exposure time are used to control a camera.

12. The AE control system of claim 10, wherein exposure adjustment circuit adjusts the plurality of the exposure parameters according to the variation of the decode rate value based on a gradient decent method.

13. The AE control system of claim 12, wherein the AE controller further comprises:
    a scene change detection circuit, receiving the input image and detecting whether the scene of the input image is changed to obtain the detection result,
    wherein if the scene of the input image is changed, the exposure adjustment circuit initializes values for the exposure parameters and iteratively adjusts the exposure parameters with a first step size according to the variation of the decode rate value, and
    if the scene of the input image is not changed, the exposure adjustment circuit determines whether a steady state is obtained.

14. The AE control system of claim 13, wherein the scene change detection circuit determines that the scene of the image is changed when the variation of the decode rate value is greater than a first preset threshold or a variation of a depth mean value is greater than a second preset threshold or a variation of an intensity value is greater than a third preset threshold.

15. The AE control system of claim 13, wherein the exposure adjustment circuit is further configured to:
- determine whether the variation of the decode rate value is greater than or equal to a fourth preset threshold;
- if the variation of the decode rate value is greater than or equal to the fourth preset value, the exposure adjustment circuit determines that the steady state is obtained; and
- if the variation of the decode rate value is smaller than the fourth preset value, the exposure adjustment circuit determines that the steady state is not obtained.

16. The AE control system of claim 13, wherein the
- if the steady stated is not obtained, the exposure adjustment circuit iteratively adjusts the exposure parameters according to the variation of the decode rate value in the first step size; and
- if the steady state is obtained, the exposure adjustment circuit iteratively adjusts the exposure parameters according to the variation of the decode rate value in a second step size, wherein the second step size is smaller than the first step size.

17. The AE control system of claim 10, wherein the camera is further configured to capture a first image with a structured light pattern and a first projection power and a second image with the structured light pattern and a second projection power, wherein the first projection power is the highest projection power that is supported by the projector, and the second projection power is the lowest projection power that is supported by the projector, and
- the ROI determination circuit is configured to remove over-exposure regions and under-exposure regions in the first image and the second image to obtain remaining regions, wherein the over-exposure regions has exposure values greater than a first exposure threshold and the under-exposure region has exposure values smaller than a second exposure threshold, and the ROI determination circuit selects the ROI among the remaining regions according to the decode rate value.

18. The AE control system of claim 10, wherein the ROI determination circuit obtains a user-defined region and selects the ROI among the remaining regions according to the decode rate value and the user-defined region.

* * * * *